(12) United States Patent
Ichikawa et al.

(10) Patent No.: US 10,384,851 B2
(45) Date of Patent: Aug. 20, 2019

(54) COMPOSITE FOAMED CONTAINER

(71) Applicant: TOYO SEIKAN GROUP HOLDINGS, LTD., Tokyo (JP)

(72) Inventors: Kentarou Ichikawa, Kanagawa (JP); Norio Akuzawa, Kanagawa (JP); Nobuhisa Koiso, Kanagawa (JP); Hiroki Iino, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 96 days.

(21) Appl. No.: 14/784,753

(22) PCT Filed: Apr. 25, 2014

(86) PCT No.: PCT/JP2014/061712
§ 371 (c)(1),
(2) Date: Oct. 15, 2015

(87) PCT Pub. No.: WO2014/178346
PCT Pub. Date: Nov. 6, 2014

(65) Prior Publication Data
US 2016/0083167 A1    Mar. 24, 2016

(30) Foreign Application Priority Data

May 2, 2013 (JP) .................. 2013-096759

(51) Int. Cl.
*B29C 49/00* (2006.01)
*B65D 81/02* (2006.01)
(Continued)

(52) U.S. Cl.
CPC ........ *B65D 81/022* (2013.01); *B29C 49/0005* (2013.01); *B29C 49/6454* (2013.01);
(Continued)

(58) Field of Classification Search
CPC .. B65D 81/022; B65D 81/3839; B29C 49/06; B29C 2049/001; B29K 2105/04;
(Continued)

(56) References Cited

U.S. PATENT DOCUMENTS 8,714,401 B2    5/2014   Ichikawa et al.
2009/0026198 A1  1/2009   Ichikawa et al.
(Continued)

FOREIGN PATENT DOCUMENTS

CN    104379458    2/2015
JP    2006-124019    5/2006
(Continued)

OTHER PUBLICATIONS

Chinese Office Action issued in Patent Application No. 201480024872.X, dated Aug. 3, 2016.
(Continued)

*Primary Examiner* — Lee E Sanderson
*Assistant Examiner* — Michael C Romanowski
(74) *Attorney, Agent, or Firm* — Greenblum & Bernstein, P. L. C.

(57) ABSTRACT

A composite foamed container forming, in the body portion, thereof, a foamed region in which foamed cells are distributed, the foamed region including a first gradationally foamed region A having a gradational distribution of the foamed cells of which the length in the direction of maximum stretch gradationally decreasing from the outer surface side of the body portion toward the inner surface side thereof and a second gradationally foamed region having a gradational distribution of the foamed cells of which the length in the direction of maximum stretch gradationally decreasing from the inner surface side of the body portion toward the outer surface side thereof. The container has a large resistance against the pressure exerted on the outer surface, good (Continued)

liquid-dispelling property and, at the same time, has improved appearance and heat resistance.

5 Claims, 4 Drawing Sheets

(51) Int. Cl.
 *B65D 81/38* (2006.01)
 *B29C 49/64* (2006.01)
 *B29L 31/00* (2006.01)
 *B29K 105/04* (2006.01)
 *B29C 49/06* (2006.01)
 *B29K 267/00* (2006.01)

(52) U.S. Cl.
 CPC .......... *B65D 81/3839* (2013.01); *B29C 49/06* (2013.01); *B29C 2049/001* (2013.01); *B29K 2105/04* (2013.01); *B29K 2105/046* (2013.01); *B29K 2267/003* (2013.01); *B29L 2031/7158* (2013.01)

(58) Field of Classification Search
 CPC ........ B29K 2105/046; B29K 2267/003; B29L 2031/7158
 USPC ................. 428/36.91, 36.92; 220/560.15
 See application file for complete search history.

(56) References Cited

U.S. PATENT DOCUMENTS

| | | | |
|---|---|---|---|
| 2010/0326994 A1* | 12/2010 | Ichikawa | B29B 11/08 220/675 |
| 2014/0110415 A1 | 4/2014 | Ichikawa et al. | |
| 2014/0183775 A1 | 7/2014 | Ichikawa et al. | |
| 2014/0231426 A1* | 8/2014 | Ichikawa | B29B 11/08 220/62.11 |
| 2015/0083737 A1 | 3/2015 | Lino et al. | |

FOREIGN PATENT DOCUMENTS

| | | | |
|---|---|---|---|
| JP | 2007-320068 | 12/2007 | |
| JP | 2008-094495 | 4/2008 | |
| JP | 2009-234627 | 10/2009 | |
| JP | 2013-075465 | 4/2013 | |
| JP | 2013-241001 | * 12/2013 | ............ B65D 81/30 |
| WO | 2013/047262 | 4/2013 | |

OTHER PUBLICATIONS

Korean Office Action issued in Counterpart Patent Appl. No. 10-2015-7033717, dated Aug. 14, 2017 , along with an english translation thereof.

* cited by examiner

COMPOSITE FOAMED CONTAINER

TECHNICAL FIELD

This invention relates to a foamed container having a container wall in which bubbles are distributed.

BACKGROUND ART

Containers of a polyester as represented by polyethylene terephthalate (PET) feature excellent properties such as transparency, heat resistance, gas-barrier property and the like, and have been extensively used for a variety of kinds of applications.

In recent years, on the other hand, it is a mounting demand to reutilize resources, and attempts have been made to recover the used containers inclusive of the above polyester containers and to reuse them as the recycled resin for various applications. Here, many of the contents contained in the packing containers are subject to be degraded with light, as represented by some kinds of beverages, medicines, cosmetics and the like. Therefore, these kinds of contents are provided being contained in opaque containers that are formed by using a resin composition of a resin blended with a coloring agent such as pigment. From the standpoint of reutilizing the resources, however, adding the coloring agent is not desired (since it makes it difficult to maintain transparency in the recycled resins). Therefore, it has now been demanded to use transparent containers. Accordingly, even those opaque containers suited for containing photo-degradable contents must be improved for their properties so as to be used again.

In order to impart light-shielding property (opaqueness) without using coloring agent, it can be contrived to realize a foamed container by making bubbles present in the container wall. A variety of proposals have been made concerning such foamed plastic containers. For instance, a patent document 1 discloses a foamed plastic container proposed by the present inventors and having a container wall in which foamed cells are distributed being flattened by the stretching, the flat foamed cells having lengths in the axial direction of the container (in the direction of a maximum stretch) that are decreasing from the outer surface of the container toward the inner surface thereof.

PRIOR ART DOCUMENT

Patent Document

Patent document 1: JP-A-2009-234627

OUTLINE OF THE INVENTION

Problems that the Invention is to Solve

The foamed plastic container of the above patent document 1 has such advantages that since finely foamed cells are distributed on the inner surface side, it has a high resistance against the pressure exerted on the outer surface and, further, is highly smooth on the inner surface of the container providing good liquid-dispelling property (i.e., can be easily washed) exhibiting, however, not so good appearance since the outer surface of the container is not so smooth. Moreover, since the foaming and the stretching are conducted while heating the inner surface at a temperature that is not so high (the foamed cells become large if the inner surface is heated at a high temperature), the container has a low heat resistance on the side of the inner surface thereof.

It is, therefore, an object of the present invention to provide a foamed container having a large resistance against the pressure exerted on the outer surface, having good liquid-dispelling property and, at the same time, having improved appearance and heat resistance.

Means for Solving the Problems

According to the present invention, there is provided a composite foamed container forming, in the body portion, thereof, a foamed region in which foamed cells are distributed, the foamed region including a first gradationally foamed region having a gradational distribution of the foamed cells of which the length in the direction of maximum stretch gradationally decreasing from the outer surface side of the body portion toward the inner surface side thereof and a second gradationally foamed region having a gradational distribution of the foamed cells of which the length in the direction of maximum stretch gradationally decreases from the inner surface side of the body portion toward the outer surface side thereof.

In the present invention, it is desired that:
(1) The body portion of the foamed container includes a tapered portion that is continuous to a mouth portion of the container and having an inner diameter that is increasing from the mouth portion toward the bottom portion, the tapered portion forming the first gradationally foamed region;
(2) The tapered portion is continuous to the straight body portion that is forming the second gradationally foamed region; or
(3) The tapered portion has a curved shoulder shape and has its lower portion continuous to a curved/recessed portion that is drawn and, further, has a minimum diameter portion, the curved/recessed portion forming the second gradationally foamed region; and
(4) The composite foamed container is a blow-formed container.

Effects of the Invention

The composite foamed container of the present invention has an important feature in that the container has, in its body portion, two gradationally foamed regions in which the diameters of the foamed cells are gradated quite opposite to each other in the direction of the thickness of the container.

Namely, in the first gradationally foamed region like in the above-mentioned patent document 1, the length of the foamed cells in the direction of maximum stretch is gradationally decreasing from the outer surface side of the body portion toward the inner surface side thereof. The container in which the foamed cells are distributed like this has a large resistance against the pressure exerted on the outer surface thereof. If an external force is exerted on the body portion of the container, in general, the inner surface side of the container body portion is so deformed as to be on the inside of the flexural deformation though it is dependent upon how the external force is exerted or upon the shape of the container. To obtain a foamed body which is strong against the flexural deformation, it is recommended that the degree of foaming is low on the inside of bending and, specifically, near the inner surface yet maintaining the thickness of the foamed body as a whole that is increased due to the foaming. This is because the foamed cells are subject to be buckled more on the inside of bending on where the compressive force acts than on the outer side of bending on where the tensile force acts.

Therefore, the first gradationally foamed region in which the foamed cells of small diameters are distributed in the body portion of the container on the inner surface side thereof is advantageous for maintaining resistance against the deformation, i.e., in maintaining a large flexural rigidity and excellent resistance against the pressure exerted on the outer surface.

In this region, further, the inner surface of the container is highly smooth and, therefore, exhibit good water-dispelling property and can be excellent washed. Prior to filling the content, for instance, water is introduced into the container to wash it. In this case, the container is held in an inverted state and water is injected into the container through the container mouth portion to wash. That is, the interior of the container is washed with water as described above. Here, however, water is favorably dispelled out of the interior of the container; i.e., water does not remain in the container but is quickly drained.

In the second gradationally foamed region, on the other hand, the foamed cells have lengths in the direction of maximum stretch that are gradationally decreasing from the inner surface side of the body portion toward the outer surface side thereof. That is, the foamed cells on the outer surface side of the body portion have the smallest length in the axial direction. It will, therefore, be learned that in this region, the outer surface of the container is rich in smoothness and exhibits excellent appearance.

In this region, further, the foamed cells have the greatest length on the inner surface side of the body portion. Namely, the inner surface side of the body portion is formed being heated more strongly than on the outer surface side. As a result, the inner surface of the body portion has a large heat resistance and effectively suppresses the thermal shrinkage on the inner surface side. For instance, deformation due to the thermal shrinkage can be effectively prevented even if the container is filled with the content at a high temperature.

As will be understood from the foregoing description, the first gradationally foamed region formed in the body portion of the container has large resistance against the pressure exerted on the outer surface and, further, exhibits excellent liquid-dispelling property (can be washed excellently) accompanied, however, by poor appearance and unsatisfactory heat resistance. The second gradationally foamed region, on the other hand, exhibits good appearance and excellent heat resistance but is unsatisfactory in regard to water-repelling property or resistance against the pressure exerted on the outer surface.

That is, the composite foamed container of the present invention has two gradationally foamed regions having properties that are just opposite to each other formed in the container body portion compensating for their respective defects. Upon suitably adjusting the ratio of areas of these foamed regions, therefore, it is allowed to effectively exhibit their properties.

MODES FOR CARRYING OUT THE INVENTION

<Distributed Structures of Foamed Cells>

Figure 1:
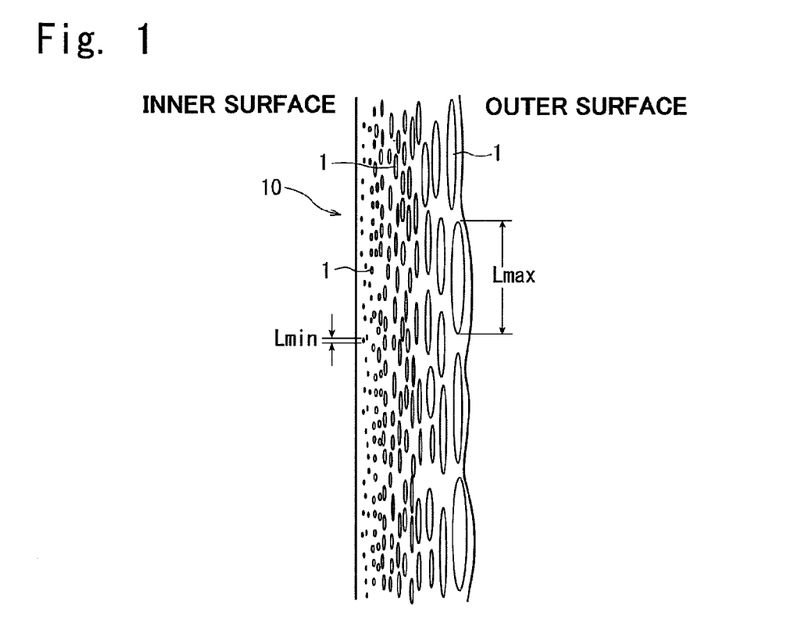
FIG. 1 is a view illustrating a distributed structure of foamed cells in a first gradationally foamed region in a composite foamed container of the invention.
Figure 2:
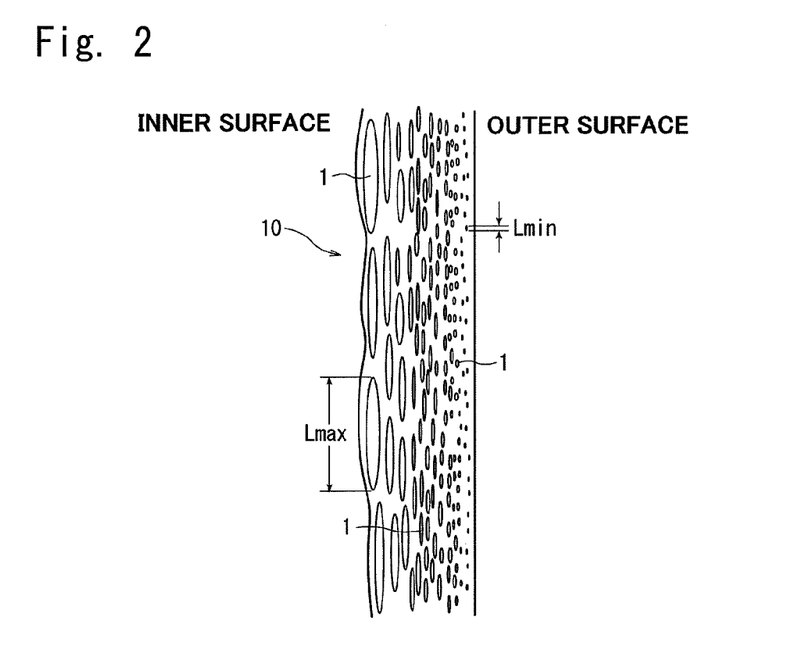
FIG. 2 is a view illustrating a distributed structure of foamed cells in a second gradationally foamed region in the composite foamed container of the invention.

Referring to FIGS. 1 and 2 illustrating distributed structures of foamed cells in the composite foamed container of the invention, a container body wall 10 contains foamed cells 1 distributed therein. As will be learned from these drawings, the foamed cells are all assuming a flat shape. That is the composite foamed container of the invention is stretched over a portion that becomes the container body portion. Upon being stretched, the foamed cells which should have a spherical shape or a shape close to a sphere have now been stretched. The foamed cells of such a flat shape are distributed being overlapped over and over in the direction of the thickness imparting a high degree of light-shielding property to the body wall 10.

In the composite foamed container of the invention, the container body wall 10 is forming the first gradationally foamed region in which the flat foamed cells 1 are distributed in the direction of the thickness being gradated as shown in FIG. 1 and the second gradationally foamed region in which the foamed cells are distributed being gradated as shown in FIG. 2.

In the first gradationally foamed region shown in FIG. 1, the length L of the foamed cells 1 in the direction of maximum stretch (hereinafter often referred to simply as cell diameter) is gradationally decreasing from the outer surface side of the container body portion toward the inner surface side thereof, the foamed cells 1 located on the outermost surface side of the container having the largest cell diameter L and foamed cells 1 located on the innermost surface side having the smallest cell diameter L.

In the first gradationally foamed region where the cell diameters are gradationally varying as described above, the inner surface is highly smooth and exhibits particularly favorable liquid-dispelling property and can be excellently washed. Namely, when a washing liquid (or sterilizing liquid) such as water or the like is introduced into the container, the liquid introduced therein can be quickly drained by inverting the container.

Further, if the cell diameters are gradationally changing as described above, the container body portion has a large resistance against the pressure exerted on the outer surface and exhibits a large flexural rigidity. That is, if an external force is exerted on the container body portion, the compressive stress concentrates on the inner surface side of the container body portion and the foamed cells tend to be more easily buckled than on the outer surface side. In the first gradationally foamed region, however, the foamed cells have the smallest diameter L on the inner surface side and, as a result, a large flexural rigidity is exhibited.

In the first gradationally foamed region having the above-mentioned properties, however, the cell diameter L is large on the outer surface side. Therefore, the outer surface is poor in smoothness and fails to exhibit good appearance.

Moreover, it has low heat resistance and is liable to shrink if exposed to high temperatures. That is, the container is, usually, produced by forming a container preform and subjecting the preform to the stretch-forming as represented by the blow-molding to form it into the container. The thus formed container has its inner surface of the body portion deformed in an amount larger than the amount of deformation in the outer surface and, therefore, contains much stress. With the foamed cells being distributed as shown in FIG. 1, however, the cell diameter L is the smallest on the inner surface side of the body portion. That is, the inner surface side of the body portion is heated at a temperature that is adjusted to be low (if heated at a high temperature, the cell diameter L increases). It will, therefore, be understood that in the first gradationally formed region, the heating is not enough for relaxing the stress on the inner surface side of the body portion. Therefore, the first gradationally formed region has a small heat resistance. If the inner surface of the body portion is exposed to high temperatures, then a large deformation (shrinkage) occurs in the inner surface.

In the second gradationally foamed region formed in the container body portion together with the above first gradationally foamed region according to the present invention as shown in FIG. 2, the cell diameters of the flat foamed cells 1 are gradationally changing in a manner just opposite to that in the first gradationally foamed region. That is, in the second gradationally foamed region shown in FIG. 2, the cell diameter L of the foamed cells a (length in the direction of maximum stretch) is gradually decreasing from the inner surface side of the body wall 10 toward the outer surface side thereof, the foamed cells 1 located on the outer surface side having the smallest cell diameter L and the foamed cells 1 located on the inner surface side having the largest cell diameter L. Therefore, the second gradationally foamed region has properties just opposite to those of the first gradationally foamed region.

If concretely described, as will be understood from FIG. 2, in the second gradationally foamed region, the body wall 10 has a highly smooth outer surface and, therefore, has excellent appearance. The body wall 10, however, has a poorly smooth inner surface and, therefore, has liquid-dispelling property (can be washed) inferior to that of the first gradationally foamed region.

Further, the foamed cells 1 located on the inner surface side have the largest cell diameters L and, hence, the inner surface has a large heat resistance. That is, to grow large foamed cells 1, the inner surface is heated at a temperature higher than the temperature for the outer surface. As a result, stress is relaxed on the inner surface side, and the thermal shrinkage is effectively suppressed if it is exposed to high temperatures. On the other hand, if an external force is exerted on the container body portion, the flexural rigidity is inferior to that in the first gradationally foamed region.

As described above, the first gradationally foamed region and the second gradationally foamed region have properties that are just opposite to each other. In the composite foamed container of the present invention having the first gradationally foamed region and the second gradationally foamed region formed in the body wall, therefore, these regions compensate for their respective defects. In the invention, therefore, upon suitably adjusting the area ratio of the first gradationally foamed region and the second gradationally foamed region or the shape of the body portion having these regions, it is made possible to effectively suppress the defects caused by foaming and to effectively exhibit the advantage.

In the above first and second gradational regions, from the standpoint of assuring light-shielding property due to foaming and, at the same time, to exhibit properties of the respective regions to a sufficient degree, it is desired that in either region a maximum value (Lmax) of cell diameter L of flat foamed cells is about 20 to about 400 µm, a minimum value (Lmin) of cell diameter L is not more than about 100 µm and that the number of cells overlapping in the direction of thickness of the body wall is about 10 to about 70.

<Composite Foamed Container>

Figure 3:
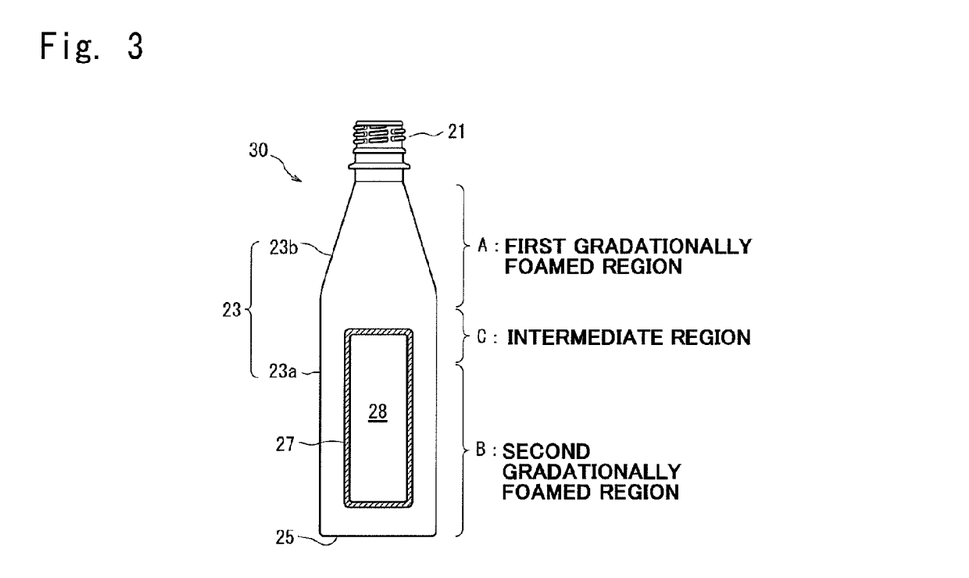
FIG. 3 is a view illustrating a preferred embodiment of the composite foamed container of the invention.

There is no limitation on the form of the composite foamed container of the present invention so far as the body portion thereof is forming the first gradationally foamed region and the second gradationally foamed region having the distributed structures of foamed cells mentioned above. FIG. 3 shows the most preferred embodiment (blow-formed bottle) of the invention.

In FIG. 3, the composite foamed container (generally designated at 30) has a mouth portion 21 forming a thread and a support ring, a body portion 23 and a bottom portion 25. Though the mouth portion 21 has not been foamed, the body portion 23 and the bottom portion 25 are the foamed regions where the above-mentioned flat foamed cells are being distributed.

As will be understood from FIG. 3, the body portion 23 includes a straight body portion 23a continuous to the bottom portion 25 and a tapered portion 23b that is continuous to the straight body portion 23a and has an inner diameter that gradually decreases as it goes away from the straight body portion 23a. The mouth portion 21 is formed on the upper end of the tapered portion 23b.

In the composite foamed container 30 of the invention formed as described above, the above-mentioned first gradationally foamed region A is formed in the tapered portion 23b and the above-mentioned second gradationally foamed region B is formed in the straight body portion 23a.

There is no clear boundary line between the first gradationally foamed region A and the second gradationally foamed region B, but there is an intermediate region C between them. The intermediate region C is a region where the temperature gradually varies from the first gradationally foamed region A toward the second gradationally foamed region at the time when the heating is conducted for foaming that will be described later. In the intermediate region C, the cell diameter L of the flat foamed cells 1 on the inner surface side gradually increases from the first gradationally foamed region A toward the second gradationally foamed region B while the cell diameter L of the flat foamed cells 1 on the outer surface side gradually decreases from the first gradationally foamed region A toward the second gradationally foamed region B.

In the embodiment of FIG. 3, for example, the upper part of the straight boy portion 23a is the intermediate region C.

The composite foamed container 30 of the above form effectively suppresses the defects of the first gradationally foamed region A and of the second gradationally foamed region B, enabling properties of these regions to be exhibited to their maximum degrees.

In the first gradationally foamed region A formed in the tapered portion 23b, for example, excellent liquid-dispelling property and flexural rigidity against the external pressure are maintained. Here, however, the form of the tapered portion 23b is working to reduce the insufficiency of heat resistance and poorness of appearance of the first gradationally foamed region A. That is, even if the inner surface of the region A (inner surface of the tapered portion 23b) is thermally shrunk being exposed to a high temperature, it is little deformed by the thermal shrinkage since the inner surface has a small area (i.e., builds up little stress during the stretch-forming) and is being tilted. Besides, the deformation of the inner surface that is tilted affects the container little as a whole. As for poor appearance (low smoothness), the insufficiency of smoothness of the outer surface is not so conspicuous since it has been tilted. Namely, poorness of appearance of the first gradationally foamed region A is effectively reduced.

In the second gradationally foamed region B formed in the straight body portion 23a, excellent appearance and heat resistance of the inner surface are maintained. As will be understood from the above description, poorness of appearance and insufficiency of heat resistance in the first gradationally foamed region A have been effectively reduced in the composite foamed container 30. Therefore, the composite foamed container 30 as a whole exhibits favorable heat resistance and appearance. For instance, even if the container is hot-filled with the content and its inner surface is exposed to a high temperature, inconvenience is effectively prevented from occurring, such as deformation due to the thermal shrinkage.

Further, the second gradationally foamed region B is formed in the straight body portion 23a, and its inner surface is a vertical surface suited for dispelling liquid. That is, insufficiency of liquid-dispelling property which is a problem in the second gradationally foamed region B is effectively reduced. For example, even if the washing liquid such as water is fed into the container 30 by holding it in an inverted state to wash it, inconvenience is effectively suppressed, such as the washing liquid adheres and remains on the inner surface of the second gradationally foamed region B. Namely, the washing liquid can be quickly drained. Being compounded with the excellent liquid-dispelling property of the first gradationally foamed region A, therefore, the composite foamed container 30 as a whole exhibits excellent liquid-dispelling property.

The second gradationally foamed region B has a low resistance against the external pressure. In the composite foamed container 30 as shown in, for example, FIG. 3, however, a recessed portion 27 of a small width may be formed in an endless manner in the outer surface of the straight body portion 23a where the second gradationally foamed region B is formed so that the region surrounded by the recessed portion 27 serves as an external pressure absorption panel 28. That is, upon forming the recessed portion 27, it is made possible to relax the pressure exerted on the outer surface of the container and to increase the resistance against the external pressure without impairing the appearance of the container. Here, the tapered portion 23b where the first gradationally foamed region A is formed has a large resistance against the external pressure. Therefore, the composite foamed container 30 as a whole has a large resistance against the external pressure.

As described above, with the composite foamed container 30 of the form as shown in FIG. 3, properties of the first gradationally foamed region A and the second gradationally foamed region B are effectively exhibited over the while composite foamed container 30 being compounded by the form of the tapered portion 23b and the straight body portion 23a.

In the composite foamed container 30, it is recommended to suitably form the tapered portion 23b, to suitably set the ratio of the straight body portion 23a and the tapered portion 23b, and to suitably form the body portion that is continuous to the tapered portion 23b depending on the capacity and design of the desired container so that the properties can be effectively exhibited.

In the embodiment of FIG. 3, for example, the tapered portion 23b continuous to the mouth portion 21 has an inner diameter that linearly increases toward the side of the bottom portion 25. It is, however, also allowable to form the tapered portion 23b in the shape of a curved shoulder in a manner that the degree of increase in the diameter gradually decreases. Further, the portion continuous to the tapered portion 23 may not be the straight body portion 23a but may be formed in a curved shape.

Figure 4:
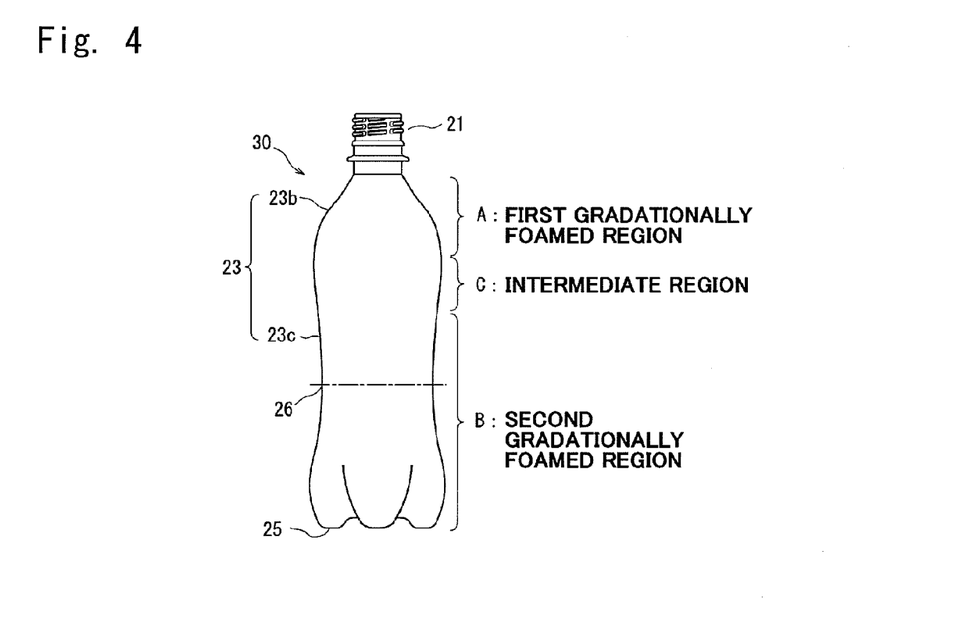
FIG. 4 is a view illustrating another embodiment of the composite foamed container of the invention.

FIG. 4 illustrates another embodiment.

In the embodiment of FIG. 4, the tapered portion 23b continuous to the mouth portion 21 is formed in the shape of a curved shoulder. The lower part of the shoulder-shaped tapered portion 23b is continuous to a recessed portion 23c that is drawn to form a smallest-diameter portion 26. That is, the first gradationally foamed region A is formed in the shoulder-shaped tapered portion 23b, the second gradationally foamed region B is formed in the recessed portion 23c, and the intermediate region C is formed in the upper part of the recessed portion 23c.

The container of this form has such an advantage that it is easy to hold in addition to having a special appearance. In this embodiment, however, if the curving degree of the recessed portion 23c is too large and the diameter of the smallest-diameter portion 26 becomes too small, then properties of the first gradationally foamed region A, such as flexural rigidity and liquid-dispelling property are spoiled. Therefore, the degree of curving should be suitably set.

<Production of the Composite Foamed Container>

The composite foamed container of the invention has the first gradationally foamed region and the second gradationally foamed region as described above, and is formed by using a resin for forming containers, preparing a melt of resin dissolving inert gas (step of dissolving gas), forming a container preform dissolving inert gas for foaming (step of forming a preform), obtaining a foamed preform in which foamed cells have been formed by heating (step of foaming), and stretching the foamed preform (step of stretch-forming).

As the resin for forming containers, there can be used thermoplastic resins that can be formed into containers like random or block copolymers of α-olefins, such as low-density polyethylene, high-density polyethylene, polypropylene, poly 1-butene, poly 4-methyl-1-pentene or ethylene, propylene, 1-butene, and 4-methyl-1-pentene; olefin resins such as cyclic olefin copolymer; ethylene•vinyl copolymers such as ethylene•vinyl acetate copolymer, ethylene•vinyl alcohol copolymer and ethylene•vinyl chloride copolymer; styrene resins such as polystyrene, acrylonitrile•styrene copolymer, ABS and α-methylstyrene•styrene copolymer; vinyl resins such as polyvinyl chloride, polyvinylidene chloride, vinyl chloride•vinylidene chloride copolymer, methyl polyacrylate and methyl polymethacrylate; polyamide resins such as nylon 6, nylon 6-6, nylon 6-10, nylon 11 and nylon 12; polyester resins such as polyethylene terephthalate (PET), polybutylene terephthalate, polyethylene naphthalate and copolymerized polyester thereof; polycarbonate resin; polyphenylene oxide resin; or biodegradable resin such as polylactic acid; and blends of the above resins. If the containers do not have to be recycled, the resins may be blended with coloring agents and modifying materials.

Among them, it is desired to use the olefin resin and the polyester resin that have heretofore been used in the field of the containers. Of them, it is most desired to use the polyester resin such as PET from the standpoint of maximizing the advantage of the present invention.

In the step of dissolving gas in a resin-mixing portion (or plasticizing portion) in a forming machine for forming preforms, the inert gas is fed with a predetermined pressure to the melt of the thermoplastic resin that is maintained in a molten state by being heated to thereby obtain the resin melt dissolving the inert gas.

As the inert gas, though not limited thereto only, there is usually used a carbonic acid gas or a nitrogen gas.

In this case, the temperature of the resin melt and the gaseous pressure are so set that the gas dissolves in amounts sufficient for forming the flat foamed cells in a desired number as shown in FIG. 1. For instance, the higher the temperature, the smaller the amount of the gas that is imbibed but the higher the rate of diffusion. The lower the temperature, the larger the amount of gas that is imbibed but the longer the time for the gas to be imbibed. Further, the higher the gaseous pressure, the larger the amount of gas that is imbibed and hence the larger the number of the foamed cells 1.

In the step of forming the preform, the resin melt is injected in the metal mold having a cavity that defines the shape of the desired preform and is cooled in the metal mold to obtain the preform of the desired shape.

With reference, for example, to a preform for forming the composite foamed container 30 of the form shown in FIG. 3, the preform 50 as a whole has the shape of a test tube as shown in FIG. 5(a), and is forming, at an upper part thereof, a mouth portion 41 (same as the mouth portion 21 shown in FIG. 3) forming a thread and a support ring thereon. The mouth portion 41 is continuous to a blow-molding portion 43 (portion that becomes the body portion 23 and the bottom portion 25 in FIG. 3).

The injection and filling into the metal mold must be so carried out that no foaming takes place at this moment. Therefore, there is employed a counter-pressure system for filling the metal mold with the gas-dissolving resin melt while maintaining the pressurized state; i.e., the metal mold is filled with the resin melt under the application of a hold pressure. The counter-pressure system and the hold pressure have been described in detail in, for example, JP-A-2009-262550 and JP-A-2008-944495, and reference should be made thereto.

Namely, the counter-pressure system is such that the metal mold is filled with the air or the like in advance to maintain a pressurized state therein, and the gas-dissolving resin melt is filled therein where the pressurized state is being maintained in order to prevent the foaming from taking place on the surface of the preform. Namely, the gas-dissolving resin melt is introduced through a portion that corresponds to the bottom portion of the preform. Here, unless the interior of the metal mold is maintained in the pressurized state, the resin melt flows permitting the gas imbibed in the resin to expand due to a pressure differential from the pressure in the metal mold. Namely, the resin melt flows in the metal mold letting the bubbles to break in the surface of the resin melt, and is cooled in this state by the metal mold. Therefore, bubbles broken in the surface appear as swirl marks on the surface of the preform and also appear on the container that is finally obtained to deteriorate the appearance of the container. However, the interior of the metal mold maintained in the pressurized state effectively works to prevent the gas imbibed in the resin from expanding (or breaking) since there is no difference in the pressure from that in the metal mold; i.e., swirl marks are effectively prevented from occurring.

If the counter-pressure system is employed, it is desired that the surface of the metal mold corresponding to the mouth portion 41 is roughened by, for example, a blast treatment, or the surface of the metal mold is so shaped that shallow ditches (air vent) are formed in the threaded part of the mouth portion 41 so that the gas pressurizing the interior of the metal mold is allowed to be quickly discharged out of the metal mold. This is because if the gas remains in the metal mold, the shape of the mouth portion 41 of the preform is collapsed due to the gas, and the thread formed on the mouth portion 41 loses its function.

Further, the hold pressure creates a means in which upon filling the metal mold with an excess of the resin, the foaming (expansion of the gas imbibed in the resin melt) is prevented from occurring due to the resin pressure. That is, after the resin melt has been injected in a predetermined amount into the metal mold, the injection is, further, continued to pressurize the resin melt in the metal mold.

By filling the metal mold with the gas-dissolving resin melt by injection based on the hold pressure and the counter-pressure method, it is made possible to obtain a preform 50 of a shape shown in, for example, FIG. 5(a).

The degree of the hold pressure and the duration of the hold pressure are so set that the weight reduction ratio of the preform calculated in compliance with the following formula is, for example, not more than 5% and, specifically, 0%, $$\text{Weight reduction ratio}=[(M_0-M_1)/M_0]\times 100$$

Wherein, $M_0$ is the weight of the preform obtained by so injecting the gas-free resin that there develops no such defect as warpage, sink mark or strain, and $M_1$ is the weight of the gas-dissolving preform obtained by dissolving the inert gas.

That is, the weight reduction ratio decreases with an increase in the hold pressure. The weight reduction ratio also decreases with an increase in the duration of the hold pressure. By utilizing these tendencies, therefore, the hold pressure and the duration of the hold pressure may be set depending upon the amount of the gas imbibed in the resin melt.

By obtaining the preform 50 for container dissolving the gas for foaming, it is allowed to adjust the structure of foamed cell distribution formed through the subsequent step of foaming so as to meet the desired gradationally foamed region.

Figure 5:
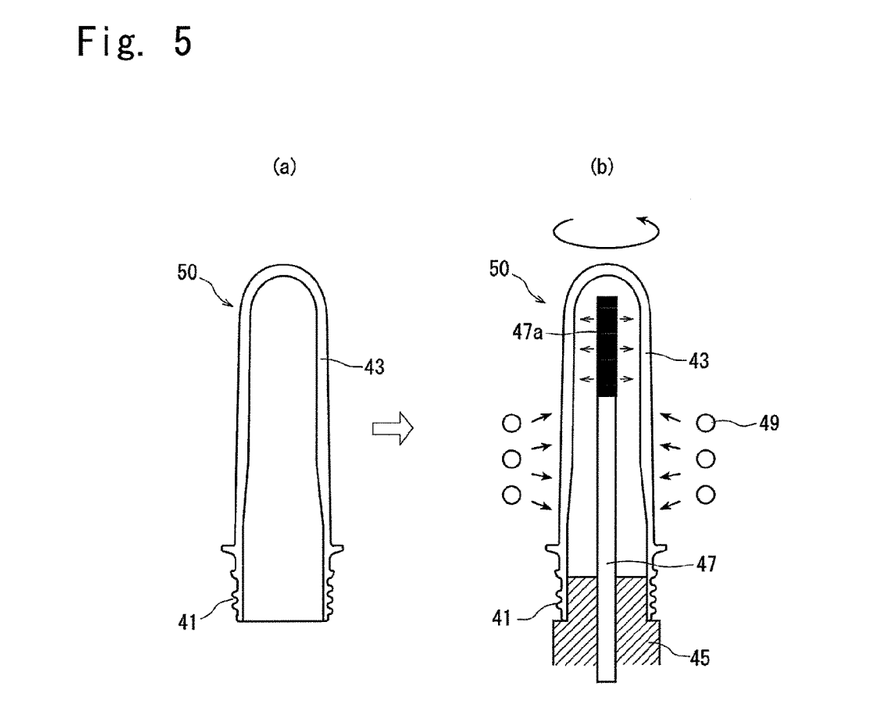
FIGS. 5(a) and 5(b) are views illustrating the steps of preparing a foamed preform for producing the composite foamed container of the invention.

When it is attempted to form a composite foamed container of the form of a bottle as shown in FIG. 3 or 4, the preform assumes the shape of a test tube as shown in FIG. 5 (a). To form the composite foamed container 30 of the shape of a cup, on the other hand, the preform 50 assumes the shape of a disk or a cup.

The container preform formed as described above assumes, in this stage, a substantially unfoamed state and is, thereafter, foamed in the next step.

Referring to FIG. 5 (b), in the step of forming, the preform 50 is heated except the mouth portion 41, i.e., the stretched portion 43 is heated at a temperature higher than a glass transition point thereof. The heating causes a sharp change in the internal energy (free energy) of the inert gas imbibed in the resin giving rise to the occurrence of phase separation; i.e., foams are formed as bubbles in the resin. To prevent the foamed preform from being deformed, the heating temperature is, as a matter of course, not higher than the melting point of the resin (preferably, not higher than 200° C. and, more preferably, not higher than 115° C. if the resin is a PET). If the heating temperature is too high, foaming takes place abruptly after the start of heating and it becomes difficult to control the cell diameters. Besides, the appearance deteriorates and the stretched portion crystallizes causing a decrease in the stretch formability such as blow formability.

In the composite foamed container 30 of the invention, the first gradationally foamed region A is formed in the tapered portion 23*b*, and the second gradationally foamed region B is formed in the straight body portion 23*a* (or the curved portion 23*c*). In the step of foaming, therefore, the stretch-forming portion 43 of the preform 50 must be so heated as to form foamed cells that meet the gradationally foamed regions A and B.

Namely, in the first gradationally foamed region A, the foamed cells have large cell diameters L on the outer surface side and have small cell diameters L on the inner surface side. Therefore, the portion corresponding to the tapered portion 23*b* (mouth portion 41 of the preform 50) is selectively heated from the outer surface side. In the second gradationally foamed region B, on the other hand, the foamed cells have large cell diameters L on the inner surface side and have small cell diameters L on the outer surface side. Therefore, the portion (bottom side of the preform 50) corresponding to the straight body portion 23*a* (or curved portion 23*c*) is selectively heated from the inner surface side.

If concretely described, as shown in FIG. 5 (*b*), the mouth portion 41 of the unfoamed preform 50 in the inverted state is held by a cooling holder 45, and a heating rod 47 is inserted through the cooling holder 45. The heating rod 47 has at its end a high-frequency induction heating portion 47*a* comprising an iron core, and has this portion positioned on the inner surface of the upper part (near the bottom) of the stretched portion 43 that becomes the straight body portion 23*a*. Further, an infrared ray heater 49 is arranged on the outer surface side of the portion (near the mouth portion 41) that becomes the tapered portion 23*b* of the stretched portion 43 of the unfoamed preform that is held in the inverted state.

In this state, the preform 50, while being turned, is heated from the inner surface side by the high-frequency heating portion 47*a* of the heating rod 47, and is, further, heated from the outer surface side by the infrared ray heater 49 while avoiding the foaming in the mouth portion 41. Thus the portion that becomes the tapered portion 23*b* of the stretched portion 43 forms foamed cells that will be distributed as shown in FIG. 1 upon being stretched, and the portion that becomes the straight body portion 23*a* (or curved portion 23*c*) of the stretched portion 43 forms foamed cells that will distributed as shown in FIG. 2 upon being stretched.

Figure 6:
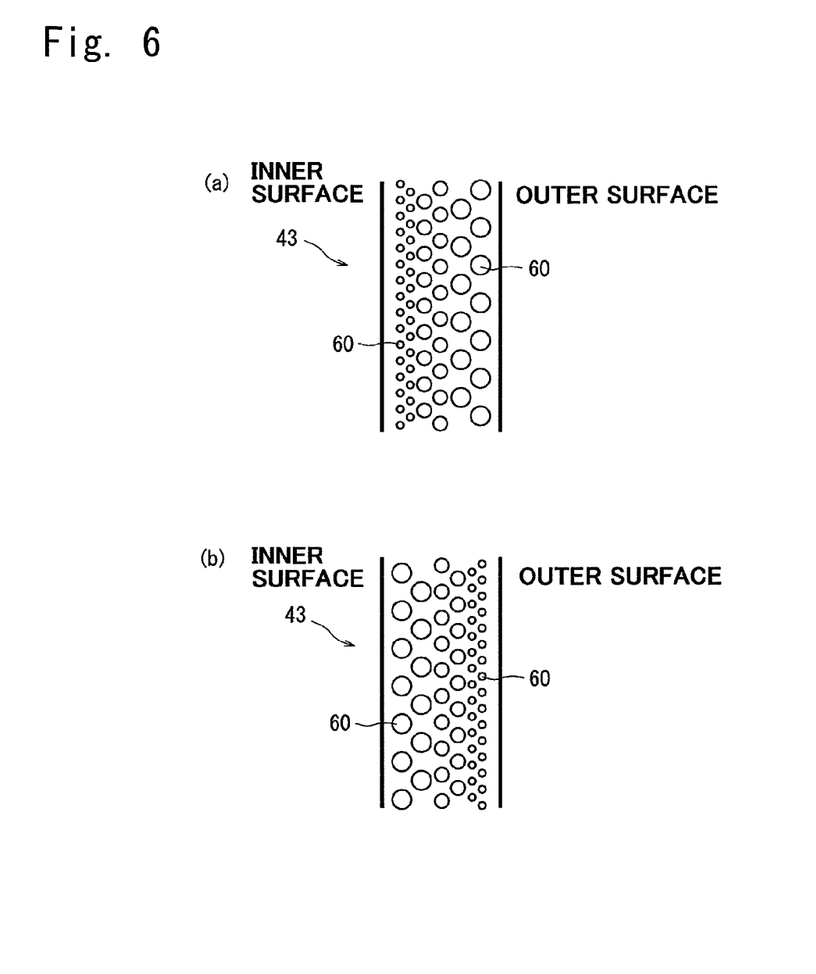
FIGS. 6(a) and 6(b) are views illustrating distributed structures of foamed cells in the foamed preform of FIGS. 5(a) and 5(b).

Referring, for example, to FIG. 6, foamed cells 60 are formed in the stretched portion 43 of the preform 50 due to the heating. The foamed cells 60, however, have not yet been stretched or drawn, and are assuming a spherical shape or a shape close to the sphere. Hereinafter, the foamed cells 60 are referred to as spherical foamed cells.

Here in the portion that becomes the tapered portion 23*b* of the stretched portion 43 as shown in FIG. 6(*a*), the spherical foamed cells 60 have diameters (equivalent to diameters of circles) that are the largest on the outer surface side and are gradually decreasing from the outer surface side toward the inner surface side due to the heating from the outer surface side. In the portion that becomes the straight body portion 23*a* (or the curved body portion 23*c*) of the stretched portion 43 as shown in FIG. 6(*b*), the spherical foamed cells 60 have diameters that are the largest on the inner surface side and are gradually decreasing from the inner surface side toward the outer surface side due to the heating from the inner surface side.

That is, formation of the foamed cells causes the infrared rays to be scattered or the heat conductivity to decrease bringing about a conspicuous gradation in the temperature profile. Namely, if heated from the outer surface side, the temperature on the inner surface side becomes lower than the temperature on the outer surface side and if heated from the inner surface side, the temperature on the outer surface side becomes lower than the temperature on the inner surface side. Due to the gradation in the temperature profile, the spherical foamed cells 60 have cell diameters that are gradationally distributed.

A portion (intermediate portion) that corresponds to the above-mentioned intermediate region C is formed between the portion heated by the high-frequency induction heating portion 47*a* from the inner surface side and the portion heated by the infrared ray heater 49 from the outer surface side. In the intermediate portion, the spherical formed cells 60 on the inner surface of the stretch-formed portion 43 have cell diameters that are gradually decreasing from the portion heated from the inner surface side thereof toward the portion heated from the outer surface side thereof while the spherical foamed cells 60 on the outer surface side of the stretch-formed portion 43 have cell diameters that are gradually increasing from the portion heated from the inner surface side thereof toward the portion heated from the outer surface side thereof.

In the invention, it is desired that the density of the spherical foamed cells 60 is, usually, set to lie in a range of about $10^5$ to about $10^{10}$ cells/cm$^3$ except in the mouth portion 41. It is, further, desired that the spherical foamed cells 60 have a maximum cell diameter (equivalent to the diameter of a circle) of about 30 to about 80 μm and a minimum cell diameter of not larger than about 30 μm in either the portion heated from the outer surface side thereof (region corresponding to the first gradationally foamed region A) or the portion heated from the inner surface side thereof (region corresponding to the second gradationally foamed region) so that the stretch-formed container exhibits favorable light-shielding property and that the first and second gradationally foamed regions A and B exhibit their properties maintaining good balance.

Specifically, if the foamed preform 50 is prepared by the above-mentioned method, foaming has been effectively suppressed at the time of injection molding. Upon adjusting the conditions, therefore, it is allowed to accurately adjust the cell density, maximum cell diameter and minimum cell diameter. For instance, if the temperature of heating for foaming is set constant, an increase in the amount of the inert gas that is imbibed causes an increase in the cell density and a decrease in the diameter of the spherical foamed cells 60. On the other hand, a decrease in the amount of the inert gas that is imbibed causes a decrease in the cell density and an increase in the diameter of the spherical foamed cells 60. The diameters of the spherical foamed cells 60, as a matter of course, increase with an increase in the temperature of heating for foaming and decrease with a decrease in the temperature of heating. The diameters of the spherical foamed cells 60, further, increase with an increase in the time of heating and decrease with a decrease in the time of heating. Upon setting the conditions by utilizing these properties, it is made possible to control the cell density, maximum cell diameter and minimum cell diameter.

The preform 50 that is foamed by heating as described above is, thereafter, subjected to the stretch-forming; i.e., the stretch-formed portion of the preform 50 turns into the body portion and the bottom portion of the container. The desired composite foamed container of the invention is thus obtained.

For instance, the foamed preform 50 is arranged in a predetermined blow-molding metal mold. While stretching the preform by stretching a stretch rod, a pressurizing gas such as air or nitrogen is blown into the preform to expand it and, therefore, to obtain the composite foamed container 30 of the invention in the form of a bottle as shown in FIG. 3 or 4.

The blow-molding is carried out at a temperature higher than a glass transition temperature of the resin but lower than a melting point thereof. It is, therefore, allowed to conduct the blow-molding following the step of foaming continuously. This is because the foamed preform 50 obtained in the step of foaming has been heated at a blow-molding temperature.

Through the above blow-molding, the spherical foamed cells 60, too, are stretched together with the container wall. As shown in FIGS. 1 and 2, therefore, there are the foamed cells 1 of a flat shape having cell diameters elongated in the direction of stretch.

Thus in the portion that is heated from the outer surface side so as to be foamed (e.g., tapered portion 23b in FIG. 3), there is formed the first gradationally foamed region A shown in FIG. 1 where the cell diameters L of the foamed cells 1 in the container body portion are gradationally decreasing from the outer surface side thereof toward the inner surface side thereof, the cell diameters L of the foamed cells 1 being the largest on the most outer surface side of the container and being the smallest on the most inner surface side thereof.

Further, in the portion that is heated from the inner surface side so as to be foamed (e.g., straight body portion 23a in FIG. 3 or curved portion 23c in FIG. 4), there is formed the second gradationally foamed region B shown in FIG. 2 where the cell diameters L of the foamed cells 1 in the container body portion are gradually decreasing from the inner surface side thereof toward the outer surface side thereof, the cell diameters L of the foamed cells 1 being the largest on the most inner surface side of the container and being the smallest on the most outer surface side thereof.

In conducting the blow-molding as described above, the outer surface of the container wall is brought into contact with the blowing metal mold and is, therefore, cooled and solidified. Here, the cells stretched in the direction of the surface are solidified maintaining their shapes. On the inner surface side of the container wall, however, the blowing pressure acts on the cells distributed in the resin that has a high temperature. Therefore, the foamed cells 1 stretched flat due to the blowing pressure are compressed and crushed. As a result, the cell diameters L of the foamed cells tend to decrease on the most inner surface side of the container. If it is attempted to control the cell diameters of the spherical foamed cells 60, therefore, attention should be given to that the cell diameters L tend to decrease on the inner surface side due to the blow-molding.

As described above, there is obtained the composite foamed container of the invention having the first gradationally foamed region shown in FIG. 1 and the second gradationally foamed region shown in FIG. 2 that are formed in the body portion; i.e., there is obtained the composite foamed container 30 of the shape of a bottle shown in, for example, FIG. 3.

The step of stretch forming is as described above with reference to a representative blow-molding. In the vacuum forming or the plug assist forming for obtaining the containers of the shape of a cup, too, the stretch-forming portion of the preform to be foamed is heated being separated into the region where the preform is to be heated from the inner surface side and the region where the preform is to be heated from the outer surface side. In the same manner as described above, therefore, there can be formed the first gradationally foamed region and the second gradationally foamed region in the stretch-formed body portion.

DESCRIPTION OF REFERENCE NUMERALS

1: flat foamed cells
10: body wall
21: mouth portion
23: body portion
23a: straight body portion
23b: tapered portion
23c: curved/recessed portion
25: bottom portion
26: recessed portion
28: external pressure absorption panel
30: composite foamed container
43: stretch-formed portion
47a: high-frequency induction heating portion
49: infrared ray heater
50: preform
60: spherical foamed cells

The invention claimed is:

1. A composite foam container comprising, in a body portion thereof, a foamed region in which foamed cells are distributed, said foamed region including
a first gradationally foamed region having a gradational distribution of the foamed cells wherein the length of the foamed cells in a direction of maximum stretch gradationally decreases from an outer surface of the body portion toward an inner surface thereof,
wherein in the first gradationally foamed region, the foamed cells having the largest length in the direction of maximum stretch are positioned in the outer surface of the body portion, and the foamed cells having the smallest length in the direction of maximum stretch are positioned in the inner surface of the body portion, and
a second gradationally foamed region having a gradational distribution of the foamed cells wherein the length of the foamed cells in the direction of maximum stretch gradationally decreases from the inner surface of the body portion toward the outer surface thereof,
wherein in the second gradationally foamed region, the foamed cells having the largest length in the direction of maximum stretch are positioned in the inner surface of the body portion, and the foamed cells having the smallest length in the direction of maximum stretch are positioned in the outer surface of the body portion.

2. The composite foamed container according to claim 1, wherein the body portion of said foamed container includes a tapered portion that is continuous to a mouth portion of the container and having an inner diameter that increases from said mouth portion toward a bottom portion, said tapered portion forming said first gradationally foamed region.

3. The composite foamed container according to claim 2, wherein said tapered portion is continuous to a straight body portion that forms said second gradationally foamed region.

4. The composite foamed container according to claim 2, wherein said tapered portion has a curved shoulder shape and has a lower portion continuous to a curved or recessed portion having a minimum diameter portion which is a narrowed portion, said curved or recessed portion forming said second gradationally foamed region.

5. The composite foamed container according to claim 1, wherein said composite foamed container is a blow-formed container.

\* \* \* \* \*